United States Patent [19]
Molloy

[11] Patent Number: 5,337,334
[45] Date of Patent: * Aug. 9, 1994

[54] SYNCHRONOUS DIGITAL SIGNAL TO ASYNCHRONOUS DIGITAL SIGNAL DESYNCHRONIZER

[75] Inventor: Nicholas J. Molloy, Haverhill, Mass.

[73] Assignee: AT&T Bell Laboratories, Murray Hill, N.J.

[ * ] Notice: The portion of the term of this patent subsequent to Dec. 7, 2010 has been disclaimed.

[21] Appl. No.: 103,654

[22] Filed: Aug. 9, 1993

Related U.S. Application Data

[63] Continuation-in-part of Ser. No. 811,273, Dec. 20, 1991, Pat. No. 5,268,935.

[51] Int. Cl.$^5$ .............................................. H04L 7/04
[52] U.S. Cl. ....................................... 375/118; 375/120; 370/105.3; 328/55; 369/60
[58] Field of Search ................ 375/117, 118, 119, 120; 370/105.3, 102; 328/55; 369/60

[56] References Cited

U.S. PATENT DOCUMENTS

| | | | |
|---|---|---|---|
| 4,791,652 | 12/1988 | McEachern et al. | 375/118 |
| 4,847,875 | 7/1989 | Choi | 375/112 |
| 4,928,275 | 5/1990 | Moore et al. | 375/118 |
| 5,052,025 | 9/1991 | Duff et al. | 375/118 |
| 5,052,031 | 9/1991 | Molloy | 375/120 |
| 5,119,406 | 6/1992 | Kramer | 375/118 |
| 5,131,013 | 7/1992 | Choi | 375/118 |

FOREIGN PATENT DOCUMENTS

| | | | |
|---|---|---|---|
| 3315372 | 10/1984 | Fed. Rep. of Germany | H04J 3/02 |
| 9112678 | 8/1991 | PCT Int'l Appl. | H04J 3/07 |

OTHER PUBLICATIONS

"Jitter Reduction in SDH Networks" by H. Sari and G. Karam, International Conference on Communications, vol. 3, Jun. 23, 1991, pp. 1413–1417.

"SONET Desynchronisers", Contribution to T1 Standards Project, T1X1.6/89–012, British Telecom, Feb. 8, 1989.

"Design and Performance Verification of a Sonet-To-DS3 Desynchronizer" by Robert W. Hamlin, Jr., Globecom Conference Record, vol. 2, pp. 761–764, Dec. 25, 1991.

Form PTO 892–Notice of References Cited by Examiner T. Ghebretinsae, dated May 10, 1993, "A Synchronous Desynchroniser", Contribution to T1 Standards project, T1X1 6/88–026, by Sahit Say, Bellcore, Jul. 25, 1988.

European Search Report, dated Mar. 29, 1993, regarding EPO Application No. EP92310592 from the parent application, Mediavilla-Molloy 2-2, Ser. No. 08/103,654, now U.S. Pat. No. 5,268,935.

*Primary Examiner*—Stephen Chin
*Assistant Examiner*—T. Ghebretinsae
*Attorney, Agent, or Firm*—Thomas Stafford

[57] ABSTRACT

Improved jitter performance is realized in a desynchronizer for obtaining an asynchronous digital signal, e.g., a DS3 signal, from a received synchronous digital signal, e.g., a SONET STS-1 signal. The improved jitter performance results from the use of a unique dynamic bit leaking arrangement in conjunction with a digital phase locked loop and desynchronizing elastic store. An optimum bit leak interval is obtained by controllably leaking a greater number of shorter interval STS-1 bits than the number of received pointer adjustment bits or, alternatively, leaking a fewer number of longer interval bits than the net number of received pointer adjustment bits. Additionally, the affect of random pointer adjustments and the superposition of randomly received pointer adjustments on a periodic sequence of received pointer adjustments is minimized by employing a "static" queue of pointer adjustment bits to be leaked. The queue is dynamically maintained at its "static" count so that there are always bits in the queue to be leaked at the desired optimum bit leak interval even in the presence of randomly received pointer adjustments. In certain applications a fixed bit leak rate is employed in conjunction with the leak queue to control the leaking of bits.

16 Claims, 5 Drawing Sheets

SYNCHRONOUS DIGITAL SIGNAL TO ASYNCHRONOUS DIGITAL SIGNAL DESYNCHRONIZER

CROSS-REFERENCE TO RELATED APPLICATION

This application is a continuation-in-part of U.S. patent application Ser. No. 07/811,273, filed Dec. 20, 1991, now U.S. Pat. No. 5,268,935 issued Dec. 7, 1993, entitled "Synchronous Digital Signal To Asynchronous Digital Signal Desynchronizer".

TECHNICAL FIELD

This invention relates to digital transmission systems and, more particularly, to converting synchronous digital signals to asynchronous digital signals.

BACKGROUND OF THE INVENTION

Prior techniques and arrangements for convening synchronous digital transmission signals to asynchronous digital signals are known. In recent digital transmission systems, it has become important to smooth large gaps in a supplied data signal resulting from overhead bit removal and stuff bits. This is particularly important, for example, in converting a SONET STS-1 synchronous digital signal to a DS3 asynchronous digital signal. As is known, pointer adjustments are used in the STS-1 signal format to reconcile small phase and frequency differences between a clock signal derived from an incoming STS-1 signal and a local clock signal. These pointer adjustments are made on a byte-wise basis and can be either positive or negative. During normal system operation, the pointer adjustments occur relatively infrequently. This causes a low frequency, relatively large peak-to-peak jitter component in the desynchronized signal. When the system operation is degraded, pointer adjustments may occur more often, and randomly occurring pointer adjustments may be superimposed on the normal periodic sequence of pointer adjustments. This superposition of randomly occurring pointer adjustments can cause the cancellation of one or more pointer adjustments of and/or the addition of one or more pointer adjustments to the periodically occurring pointer adjustments. Such occurrences are undesirable from a jitter performance point of view.

A bit leaking technique in conjunction with a phase locked loop and a desynchronizing elastic store has been proposed in an attempt at smoothing gaps in a data signal caused by the pointer adjustments in a SONET signal format. A bit leak is defined as one (1) bit of phase error being supplied to a phase locked loop. One of these techniques employs a bit-by-bit leaking adjustment so that a phase locked loop having a "wider" bandwidth may be employed in the desynchronizer. This bit-by-bit technique, when constrained by a payload output jitter specification to be satisfied, however, does not adequately compensate for the full range of pointer adjustment rates which may occur.

More recently, as disclosed in U.S. Pat. No. 5,052,025 issued on Sep. 24, 1991, an open loop estimation averaging arrangement has been employed to derive a bit leaking interval. One problem with the open loop estimation averaging technique is that the average bit leaking interval is only updated on detection of the next received pointer adjustment. This prior arrangement also employs a centering scheme for an associated desynchronizing elastic store. Such a scheme can be a potential source of significant jitter in the data signal output of the elastic store. Although this prior known technique operates satisfactorily in normal pointer adjustment operation, its performance is not entirely satisfactory in a degraded mode of operation. Such a degraded mode of operation occurs in the presence of random pointer adjustments and the superposition of the random pointer adjustments on the periodically received pointer adjustments.

SUMMARY OF THE INVENTION

The problems relating to jitter performance of prior known bit leaking arrangements are overcome, in accordance with the invention, by employing a unique closed loop feedback bit leaking arrangement in which bits are advantageously leaked at an optimum bit leak interval. The optimum bit leak interval is dynamically realized, in accordance with the invention, by controllably leaking a greater number of shorter interval bits at a higher rate than the received net number of received pointer adjustment bits. That is to say, for a predetermined net number of received pointer adjustment bits, a greater number of bits each having a shorter bit interval than the pointer adjustment bits is leaked. In this manner, the desired optimum leak interval is advantageously obtained. The optimum bit leak interval may similarly be obtained by leaking a fewer number of longer interval bits at a rate lower rate than the net number of received pointer adjustment bits.

In accordance with an aspect of the invention, the effect of random pointer adjustments and the superposition of randomly received pointer adjustments on a periodic sequence of received pointer adjustments is minimized by employing a queue to maintain a "static" count of received pointer adjustment bits. The queue is dynamically maintained at its static count value so that there are always bits available to be leaked in the presence of randomly received pointer adjustments canceling and/or adding one or more pointer adjustments in a received periodic sequence of pointer adjustments. If the absolute count value becomes greater than the static count value, bits are leaked at a slightly more rapid rate. If the absolute count value becomes less than the static count value, bits are leaked at a slightly slower rate. This is realized, in accordance with the principles of the invention, by dynamically modulating the leak interval being generated in the closed loop feedback arrangement.

In accordance with another aspect of the invention, the optimum bit leak interval is obtained by utilizing a queue which accumulates a net count of the number of received positive or negative pointer adjustment bits to which an additional bit is algebraically added when a predetermined net number of either positive or negative pointer adjustment bits is accumulated. The count of bits in the queue is monitored to provide a phase error to a unique phase locked loop in order to adjust the bit leak interval and to maintain the queue at the desired static count. The phase error is additionally generated in such a fashion so as to compensate for the fact that a greater number of bits than the number of received pointer adjustment bits each having a shorter interval than the received pointer adjustment bits is being leaked in order to obtain the desired optimum bit leak interval. In those applications in which longer interval bits are to be leaked, the phase error would be generated in such fashion so as to compensate for those fewer longer interval bits being leaked.

DETAILED DESCRIPTION

Figure 1:
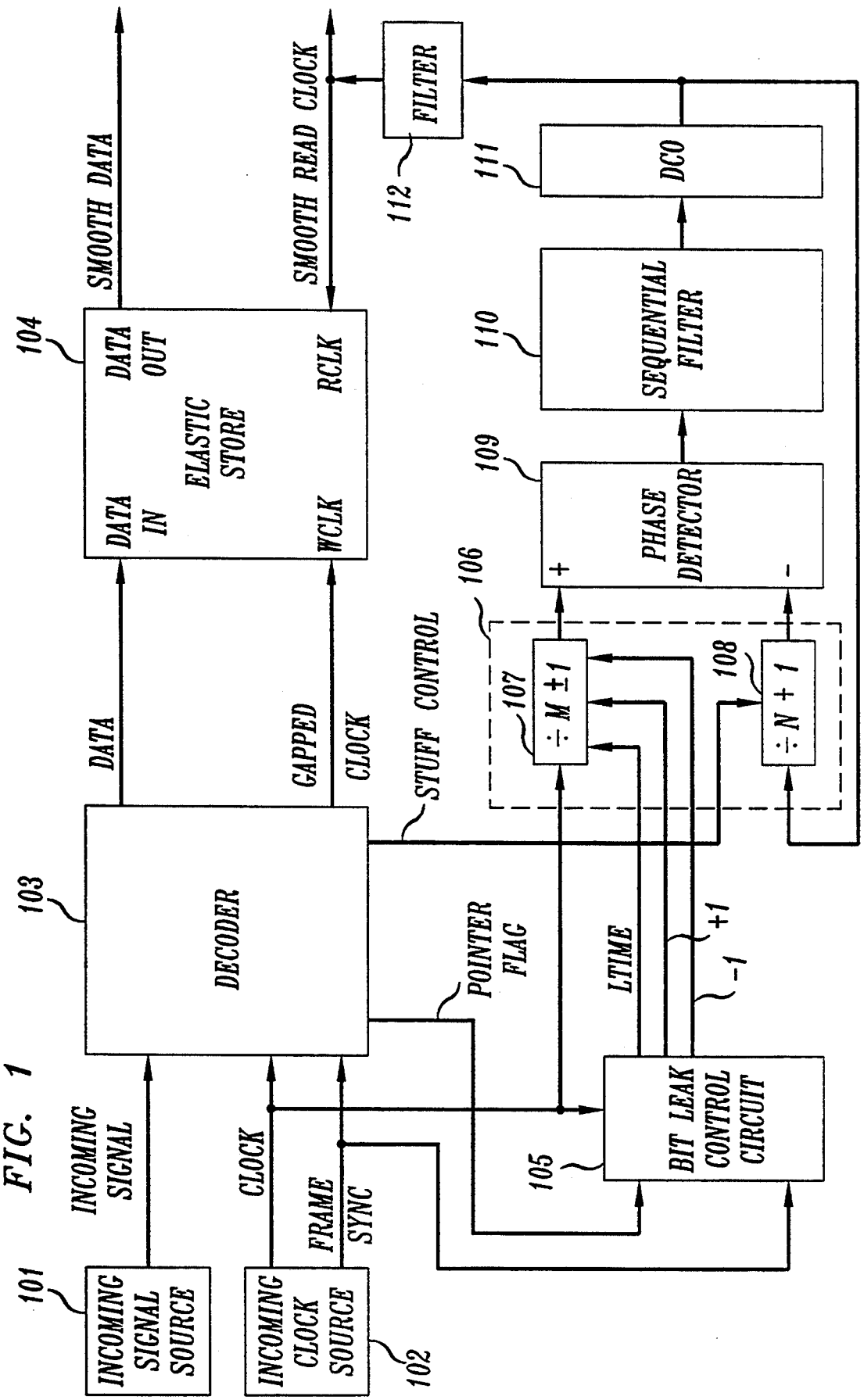
FIG. 1 shows, in simplified block diagram form, a synchronous digital signal to asynchronous digital signal desynchronizer employing an embodiment of the invention.

FIG. 1 shows, in simplified block diagram form, details of a synchronous digital signal to asynchronous digital signal desynchronizer including an embodiment of the invention. Specifically, shown are incoming signal source 101 and incoming clock source 102. In this example, the incoming signal is an STS-1 SONET signal and the incoming clock signal is an STS-1 clock of 51.84 MHz. The incoming clock signal is typically derived from the incoming signal in known fashion. Incoming clock source 102 also generates a frame sync signal. In this example, the frame sync signal is at the STS-1 frame rate of 8 KHz. The SONET STS-1 signal format is described in a Technical Advisory entitled "SONET Transport Systems: Common Genetic Criteria", TA-NWT-000253, Bell Communications Research, September 1990 and the ANSI draft Standard entitled "Digital Hierarchy—Optical Interface Rates and Formats Specifications (SONET)", dated February 1990.

Decoder 103 is supplied with the incoming signal, incoming clock signal and incoming frame sync signal and is employed, in this example, to obtain a DS3 payload signal (DATA) from the incoming STS-1 signal and to obtain a gapped clock signal from the incoming STS-1 clock signal. The DS3 digital signal format is well known and is described in *Telecommunications Transmission Engineering*, AT&T, Volume 2, 1977. Decoder 103 supplies the DATA signal and gapped clock signal to the DATA IN and WCLK inputs, respectively, of desynchronizing elastic store 104. Decoder 103 also generates a pointer flag indicative of a pointer adjustment in the incoming STS-1 signal and whether or not it is a positive or negative adjustment. Arrangements for obtaining a DS3 payload signal from an STS-1 SONET signal format are known. It will also be apparent to individuals possessing ordinary skill in the art how to detect the presence of a pointer adjustment in the STS-1 signal from either the Technical Advisory or ANSI draft standard noted above. Specifically, the H1 and H2 bytes in the STS-1 signal format indicate the occurrence of a pointer adjustment and whether the adjustment is positive or negative. Detection of the H1 and H2 bytes in the STS-1 signal format is relatively straightforward. Additionally, decoder 103 generates, in this example, a stuff control signal from the STS-1 SPE (Synchronous Payload Envelope) payload signal being decoded from the incoming STS-1 signal. This is realized in known fashion by observing the stuff control bits, i.e., C bits, in the STS-1 SPE payload signal.

The STS-1 frame sync and clock signals are supplied from incoming clock source 102 to bit leak control circuit 105. The pointer flag is supplied from decoder 103 to bit leak control circuit 105. Bit leak control circuit 105 operates, as described below, in accordance with the invention, to adaptively controllably generate an optimum bit leak time indication LTIME. In turn, the LTIME indication is employed to compensate for pointer adjustments in the incoming digital signal, in this example, the STS-1 signal. The optimum LTIME indication is obtained in the presence of periodically occurring pointer adjustments, in the presence of randomly occurring pointer adjustments, either positive or negative, and the superposition of randomly occurring pointer adjustments on the periodic sequence of pointer adjustments. This is important in order to minimize jitter in the smooth data signal output from desynchronizing elastic store 104. Bit leak control circuit 105 also generates control signals representative of the polarity of the bit to be leaked. To this end, a +1 divisor control signal and a −1 divisor control signal are generated and employed, as described below, to control the divisor of controllable divider 107.

The STS-1 clock signal is supplied to overhead gap redistribution circuit 106 and, therein, to controllable divider 107. The LTIME indication is supplied to control the instant at which the divisor of controllable divider 107 can be adjusted in response to the +1 and −1 divisor control signals from bit leak control circuit 105. The divisor control signals are indicative of the state of the divisor of controllable divider 107, i.e., M, M+1 or M−1. In this example, predetermined divisor M is selected to be 720 which corresponds to an STS-1 subframe (an STS-1 row of 90 bytes). Using M=720 yields a reference signal of 72 KHz. This reference signal is adjusted in response to the divisor control signals from bit leak control circuit 105 at the occurrence of a LTIME pulse, in accordance with an aspect of the invention. The divisor of controllable divider 107 is controllably adjusted in response to the states of the +1 and −1 divisor control signals as follows: if both +1 and −1 divisor control signals are "0", the divisor is M; if the +1 divisor control signal is a "1", the divisor is M+1; and if the −1 divisor control signal is a "1", the divisor is M−1. It is noted that when the +1 divisor control signal is a "1", the −1 divisor control signal is a "0" and vice versa. Controllable divider 107 operates to spread fixed STS-1 overhead bits uniformly through the STS-1 subframe and provides an opportunity for leaking the pointer adjustment bytes one-bit-at-a-time at the optimum bit leak interval in response to a LTIME indication from bit leak control circuit 105. The adjusted reference signal output from controllable divider 107 is supplied to a first (+) input of phase detector 109.

Overhead gap redistribution circuit 106 also includes controllable divider 108. An output from digitally controlled oscillator (DCO) 111 is supplied to controllable divider 108. This output from DCO 111 is, in this example, the desired DS3 clock signal of 44.736 MHz. In this example, the default value of the divisor of controllable divider 108 is N=621. When the result of the majority of the five (5) STS-1 SPE stuff control bits (C bits) in decoder 103, i.e., the stuff control, is a "1" indicating that the S bit is a stuff bit, controllable divider 108 divides by the default value, i.e., N=621. When the stuff control is a "0" indicating that the S bit is an information bit, controllable divider 108 divides by (N+1)×622. Operation of controllable divider 108 is such as to spread the fixed STS-1 SPE overhead bits uniformly through the STS-1 SPE subframe and provides a stuff opportunity for synchronizing properly to the DS3 digital bit rate. An output from controllable divider 108 is an adjusted phase control signal and is supplied to a second (−) input of phase detector 109.

Phase detector 109, sequential filter 110 and DCO 111 form a digital phase locked loop which operates, in known fashion, in response to the adjusted reference signal supplied from controllable divider 107 and the adjusted phase control signal supplied from controllable divider 108 in overhead gap redistribution circuit 106 to generate the desired smooth read clock signal, in this example, the DS3 clock signal. Filter 112 is employed, in this example, to filter "high" frequency jitter in the smooth read clock signal from DCO 111. An output from filter 112 is the desired smooth read clock signal, which is supplied to the read clock (RCLK) input of desynchronizing elastic store 104. In response to RCLK, the desired smooth data signal is supplied as an output at DATA OUT of desynchronizing elastic store 104.

Figure 4:
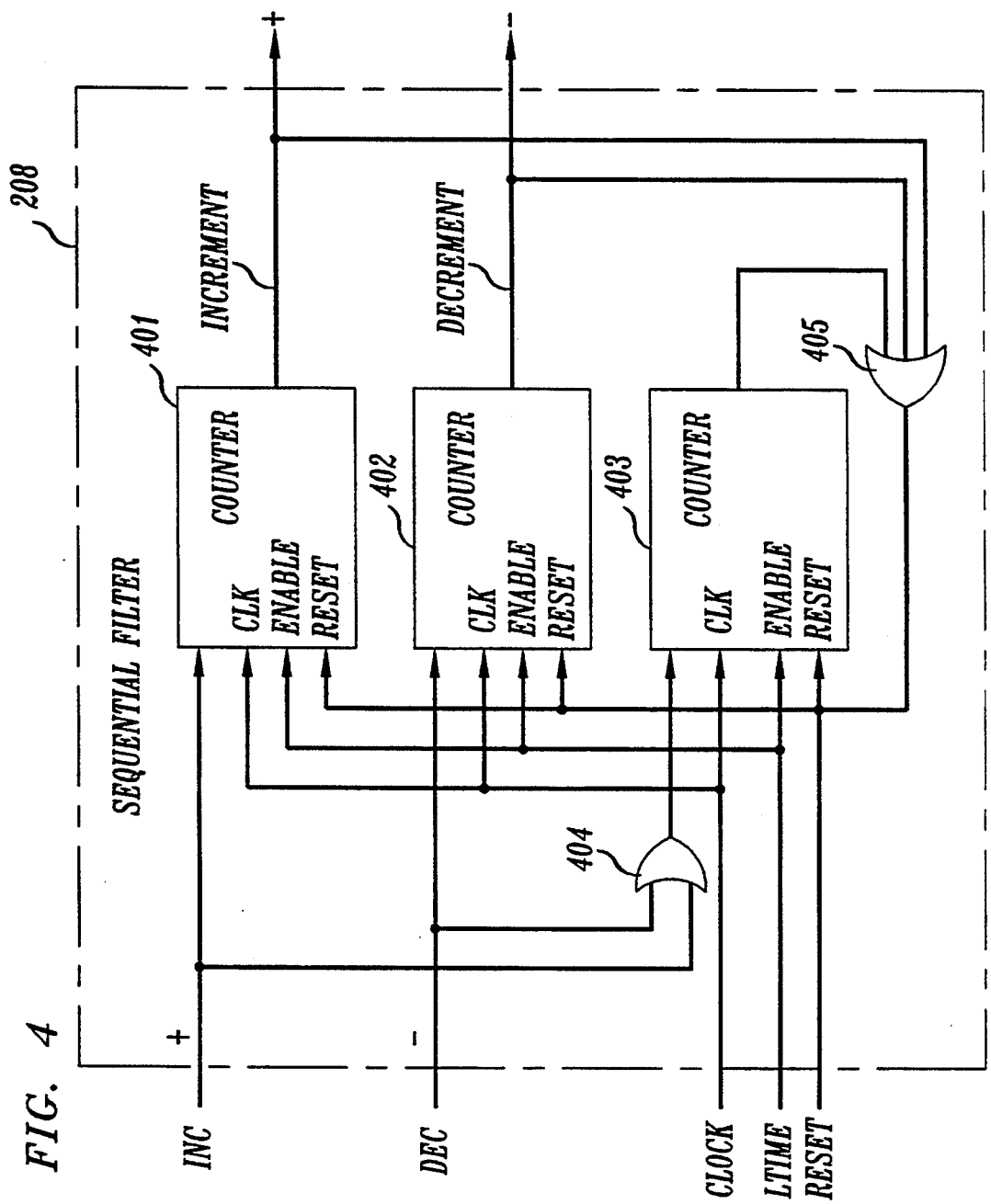
FIG. 4 shows, in simplified block diagram form, details of a sequential filter which can be advantageously employed in the bit leak control circuit of FIG. 2.
Figure 5:
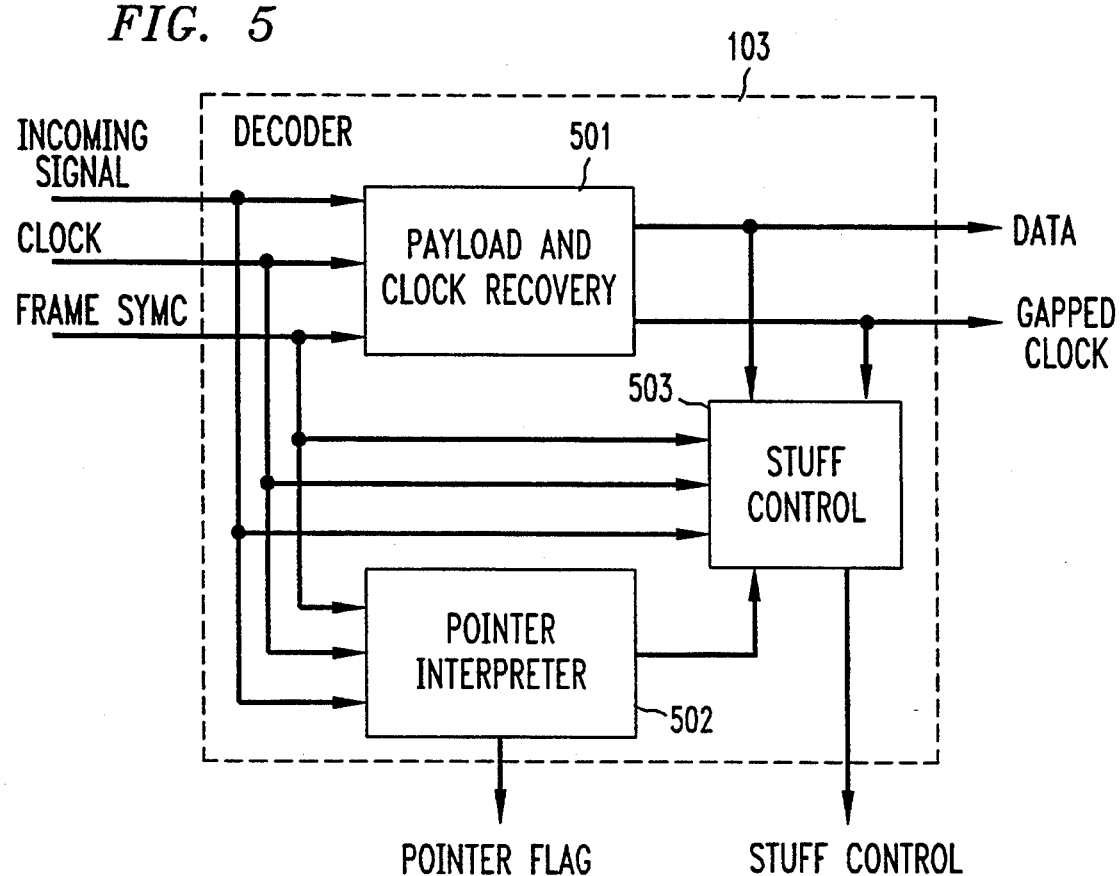
FIG. 5 shows, in simplified block diagram form, details of the decoder 103 of FIG. 1.

Details of decoder 103 are shown, in simplified form, in FIG. 5. As shown, decoder 103 includes payload and clock recovery unit 501, pointer interpreter unit 502 and stuff control unit 503. The incoming signal, in this example, the STS-1 digital signal and its corresponding CLOCK and FRAME SYNC are supplied to decoder 103 and, therein, to payload and clock recovery unit 501, pointer interpreter unit 502 and stuff control unit 503. As is known, the FRAME SYNC indicates the beginning of the STS-1 digital signal frame. As indicated above, the STS-1 digital signal is described in ANSI draft standard and includes a transport overhead section, which consists of section overhead and line overhead and a synchronous payload envelope (SPE) which includes a path over section and data section. (See for example, FIGS. 7 and 27 of the ANSI draft standard and FIGS. 3-1 through 3-4 of the Technical Advisory, both noted above).

Thus, unit 501, in response to the CLOCK and FRAME SYNC, knows the exact location of the STS-1 overhead bits and the data bits in the SPE. It then obtains the data bits from the STS-1 SPE which are supplied as an output (DATA). To this end, whenever a received bit from the incoming signal corresponds to a data bit, it is supplied as an output DATA bit and an output clock pulse (GAPPED CLOCK) is also provided. Whenever a received bit of the incoming signal does not correspond to a data bit (i.e., a non-data bit), it is not supplied as an output DATA bit and no output clock pulse (GAPPED CLOCK) is provided. (See an article entitled "Design and Performance Verification of A SONET-to-DS3 Desynchronizer", *Globecorn Conference Record*, Dec. 2-5, 1991, Volume 2, pages 761-764 for one known arrangement for obtaining a gapped clock and a gapped DS3 data signal from an incoming STS-1 signal). The output data bits and GAPPED CLOCK are also supplied to stuff control unit 503.

Pointer interpreter 502 is employed to detect and interpret the H1 and H2 STS-1 line overhead bytes. The H1 and H2 bytes constitute a pointer word and indicate the location of the synchronous payload envelope (SPE) in the STS Envelope capacity. Detection of the H1 and H2 bytes is straight-forward since their position in the STS-1 frame is known. Thus, after each FRAME SYNC the H1 and H2 bytes are easily located by counting the incoming clock pulses. The pointer word formed by H1 and H2 indicates the location of the SPE within the STS-1 frame and this indication is supplied to stuff control unit 503. This value is carded in bits 7-16 of the 16 bit pointer word consisting of the H1 and H2 bytes. Additionally, the pointer word also indicates whether there is a pointer adjustment or not and, if there is one, whether it is a positive byte adjustment or a negative byte adjustment. A positive byte adjustment is indicated by the inversion of bits 7, 9, 11, 13 and 15 (I bits) of the pointer word. A negative byte adjustment is indicated by inversion of bits 8, 10, 12, 14 and 16 (D bits) of the pointer word. Pointer interpreter 502 supplies as an output a pointer flag indicating a positive adjustment when at least 3 I bits of the pointer word have been inverted relative to those received in the previous frame. Similarly, pointer interpreter 502 supplies as an output a pointer flag indicating a negative byte adjustment when at least 3 D bits of the pointer word have been inverted relative to those D bits received in the previous frame. Otherwise, the pointer flag indicates no pointer adjustment. (See sections 10.1.1 and 10.1.2 on pages 23-24 of the ANSI draft standard and sections 3.5.1, 3.5.1.1, 3.5.1.2, 3.5.1.5 and 3.5.1.6 on pages 3-17 through 3-19 of the Technical Advisory, both noted above). Such inversions are easily detected by a straight-forward comparison of the I and D bits frame-to-frame.

Stuff control 503 is employed to determine whether a stuff opportunity bit in the subframes of the STS-1 SPE contains a data bit. To this end, it employs the pointer word value from pointer interpreter 502 to locate the SPE. Since the pointer word indicates the offset of the beginning of the SPE relative to FRAME SYNC, detection is obtained by counting the incoming CLOCK pulses after each FRAME SYNC. Once the SPE is located, GAPPED CLOCK pulses are counted to locate the C stuff control bits, in this example, in the DS3 signal. The location of the C stuff control bits in the DS3 signal fore, at is well known (see *Telecommunications Transmission Engineering*, AT&T, Vol. 2, 1977, noted above at pages 558-561). As indicated in the ANSI draft standard, noted above, at section 12.2.1, page 30, a majority vote should be used to make the stuff decision, i.e., whether the stuff opportunity bit is data or non-data. The stuff control indication is supplied as an output from stuff control unit 503.

Figure 2:
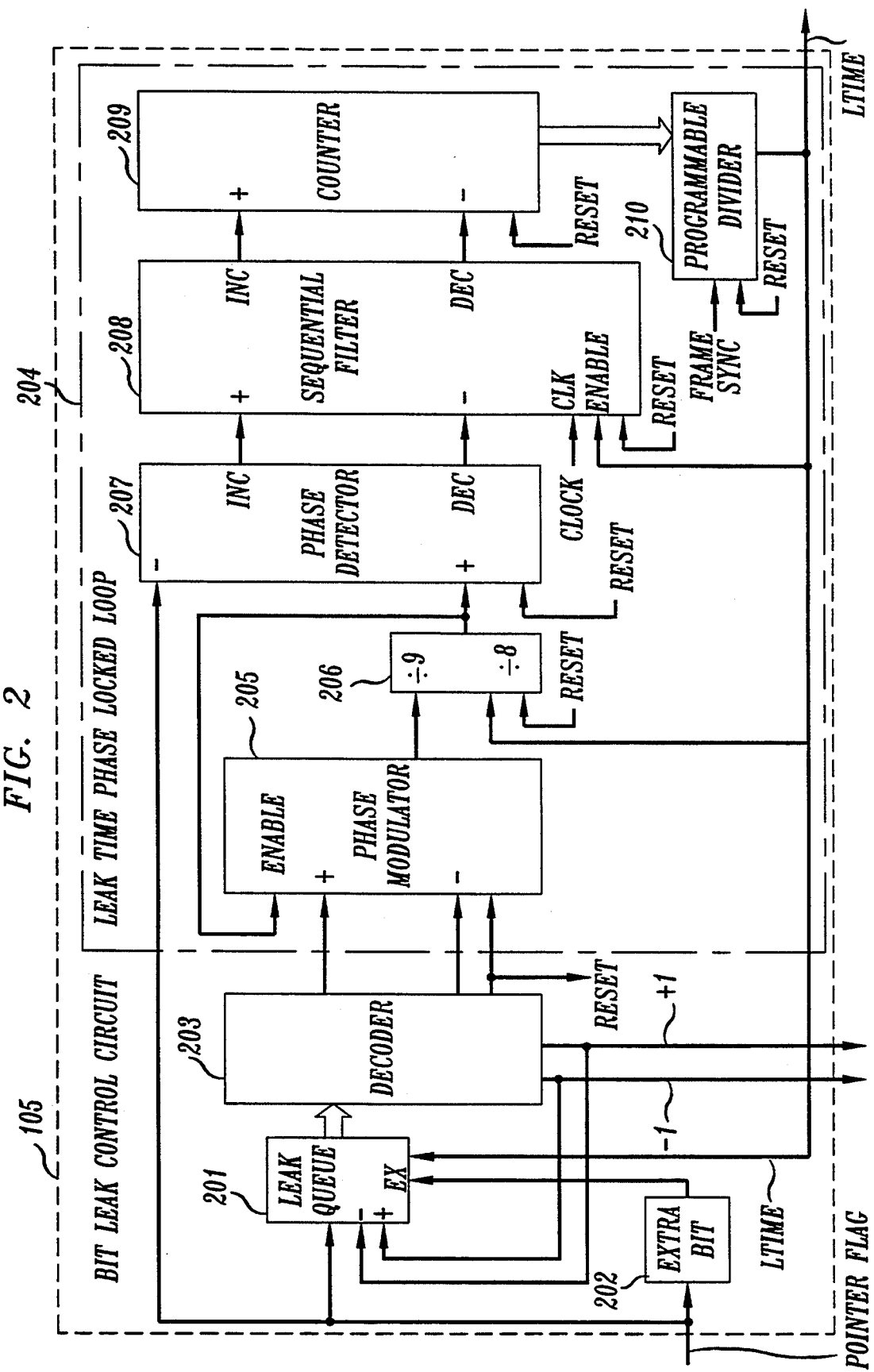
FIG. 2 shows, in simplified block diagram form, details of the bit leak control circuit of FIG. 1.

FIG. 2 shows, in simplified block diagram form, details of bit leak control circuit 105. Specifically, shown is leak queue 201. Leak queue 201 is employed, in accordance with an aspect of the invention, to establish a queue having a "static" count of received pointer adjustment bits. For the purpose of this example, "static" is defined to mean that on average there is at least a prescribed number of pointer adjustment bits, either positive or negative, in leak queue 201. Leak queue 201 having a static count of pointer adjustment bits provides bits which still can be leaked in the presence of randomly occurring pointer adjustments, in accordance with an aspect of the invention.

Briefly, it is important to note that pointer adjustments can be modeled as a periodic phase sawtooth waveform. A phase locked loop is a phase low pass filter and could easily filter such a periodic phase sawtooth waveform having a relatively fast repetition rate. However, incoming random pointer adjustments from an upstream node can cause a transient effect on the periodic sawtooth waveform. If because of incoming random pointer adjustments, one or more pointer adjustments are canceled from the pointer adjustments which are to be generated at the current node, then the periodicity of the phase sawtooth waveform will be interrupted. The phase will continue to change for a longer period of time until the direct current (DC) level of the sawtooth waveform is altered by a value corresponding to the number of canceled pointer adjustments. This transient effect causes jitter peaks in the waveform which are difficult to filter. If the static count of pointer adjustment bits in leak queue 201 is maintained at an at least prescribed value, for example, at least 32 bits, then up to four (4) pointer adjustments can be canceled without any significant change in the periodicity of the phase sawtooth waveform. Consequently, the difficult to filter jitter peaks are avoided.

The pointer flag from decoder 103 (FIG. 1) is supplied to leak queue 201, to extra bit unit 202 and to leak time phase locked loop (LTPLL) 204 and, therein, to a negative (−) input of phase detector 207. It is noted that LTPLL 204 comprises a closed loop control circuit. As indicated above, the pointer flag indicates that a pointer adjustment has been received and its polarity, i.e., positive or negative. A negative pointer adjustment increments leak queue 201 by eight (8) bits (a byte). Similarly, a positive pointer adjustment decrements leak queue 201 by eight (8) bits. In this example, leak queue 201 can store 512 bits and is initially set to a count of 256. Extra bit unit 202 is operative to cause at least one extra bit (+) or (−) to be accumulated in leak queue 201 upon reception of a predetermined net number of pointer adjustment bits. This is to provide for the greater number of STS-1 bits to be leaked than the number of received pointer adjustment bits, in accordance with an aspect of the invention. In this example, it has been determined that for every 29 net received pointer adjustment bits, 30 STS-1 bits should be leaked. Extra bit unit 202 counts the number of pointer adjustment bits being received, and in this example, for a net of 29 received positive pointer adjustment bits decrements leak queue 201 by one (1) additional bit, and for a net of 29 received negative pointer adjustment bits increments leak queue 201 by one (1) additional bit. The algebraic addition of the additional bit is to provide for the leaking of the greater number of STS-1 bits than the net number of received pointer adjustment bits. An indication that an extra bit, and its polarity, is to be added to the contents of leak queue 201 is supplied from extra bit unit 202 to the EX input of leak queue 201. Updating of the contents of leak queue 201 in response to the pointer flag and to the extra bit indication is described below.

It is noted that the received pointer adjustment bits have a bit interval determined by an STS-1 SPE clock signal having a nominal frequency of 50.112 MHz and the bits being leaked have a shorter bit interval determined by the STS-1 clock signal having a frequency of 51.84 MHz. As indicated above, a greater number of bits each having a shorter bit interval than the received pointer adjustment bits is to be leaked in order to obtain the desired optimum bit leak interval, in accordance with an aspect of the invention. It should be noted that no STS-1 SPE clock signal is available because none is required for any other purpose. Addition of such an STS-1 SPE clock would require significant additional circuitry and cost to achieve the necessary degree of stability of the clock signal.

In a similar fashion, the same technique may be applied by leaking bits having a longer bit interval than the pointer adjustment bits and compensating by leaking a fewer number of them. The relationship between the number of bits leaked as a function of the leaked bit interval is $$A = B \cdot (\text{Received Bit Interval})/(\text{Leaked Bit Interval}), \quad (1)$$

where "A" is the number of bits to be leaked and "B" is the net number of received pointer adjustment bits.

However, when fewer longer interval bits are to be leaked, extra bit unit 202 will be operative, in this example, to increment leak queue 201 by one (1) additional bit for a net of "B" received positive pointer adjustment bits, and will decrement leak queue 201 by one (1) additional bit for a net of "B" received negative pointer adjustment bits.

The count of pointer adjustment bits accumulated in leak queue 201 is supplied to decoder 203. In turn, decoder 203 evaluates the count from leak queue 201 to determine the status of the static queue and, also, to determine the polarity of the pointer adjustment bit to be leaked. If the count in leak queue 201 is greater than 256, a negative bit is to be leaked and the +1 divisor control signal output from decoder 203 is set to "1" and leak queue 201 is updated. If the count of leak queue 201 is less than 256, a positive bit is to be leaked and the −1 divisor control signal output from decoder 203 is set to "1" and leak queue 201 is updated. The +1 and −1 divisor control signals are supplied to controllable divider 107 (FIG. 1) and to decrement (−) and increment (+) inputs, respectively, of leak queue 201.

The contents of leak queue 201 are updated in accordance with a predetermined priority in response to the pointer flag, the extra bit indication, the presence of a LTIME pulse and the +1 and −1 control signals. The priority of updating the contents of leak queue 201 is as follows: first in the presence of a LTIME pulse the contents are incremented by one (1) bit when the −1 control signal is a logical 1 indicating that a positive pointer adjustment bit was leaked or decremented by one (1) bit when the +1 control signal is a logical 1 indicating that a negative pointer adjustment bit has been leaked; then in the presence of a pointer flag the contents are incremented by eight (8) bits for a negative pointer adjustment or decremented by eight (8) bits for a positive pointer adjustment; and, lastly, in the presence of an extra bit indication one (1) bit is algebraically added, i.e., the contents are incremented by one (1) bit when extra bit unit 202 indicates that the net count of received pointer adjustment bits is −29, or decremented by one (1) bit when extra bit unit 202 indicates that the net count of received pointer adjustment bits is +29.

Figure 3:
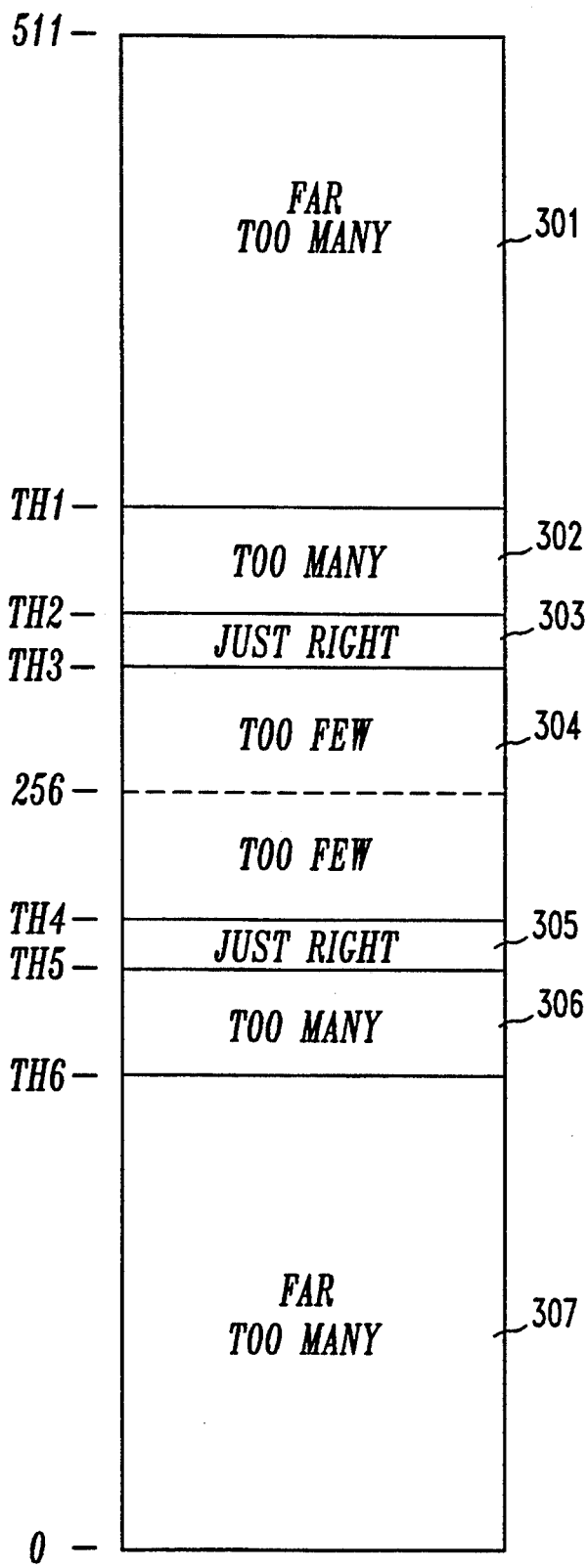
FIG. 3 is a graphic illustration of the status of the leak queue used in the bit leak control circuit of FIG. 2.

The status of the contents of leak queue 201 is determined by evaluating the absolute count of the accumulated bits therein relative to 256. If the absolute count of bits accumulated in leak queue 201 is not enough, i.e., "too few", the absolute count has to be increased. In this example, six (6) threshold values, namely, TH1 through TH6 are employed to segment the contents of leak queue 201 into seven (7) distinct status regions, as shown in FIG. 3.

Status region 301 is defined by the absolute count of leak queue 201 being equal to or greater than threshold TH1. This indicates that there are far too many negative pointer adjustment bits in leak queue 201 and a RESET is generated. The RESET causes LTPLL 204 to be reset to a condition in which LTIME pulses are generated at a predetermined shortest interval. This causes bits to be leaked more rapidly and prevents an overflow condition from occurring.

Status region 302 is defined by the absolute count of leak queue 201 being greater than threshold TH2, but less than threshold TH1. This corresponds to the situation when leak queue 201 has accumulated too many negative pointer adjustment bits. When threshold TH2 is exceeded, decoder 203 (FIG. 2) supplies an error signal to LTPLL 204 and, therein, to a decrement (−) input of phase modulator 205. This error signal causes LTPLL 204 to decrease the interval between output pulses of the LTIME indication being generated. In turn, this decreased interval causes the generation of LTIME pulses to speed up, thereby causing fewer pointer adjustment bits to be stored in leak queue 201.

Status region 303 is defined by the absolute count of leak queue 201 being greater than TH3, but less than or equal to TH2. Status region 303 indicates that the absolute value of the accumulated pointer adjustment bits is the right number and no error signal is generated.

Status region 304 is defined by the absolute count of leak queue 201 being less than or equal to threshold TH3, but greater than or equal to threshold TH4. Status region 304 indicates that leak queue 201 contains too few pointer adjustment bits (either positive or negative). Decoder 203 supplies an error signal to LTPLL 204 and, therein, to phase modulator 205. This error signal is supplied to the increment (+) input of phase modulator 205 and causes LTPLL 204 to increase the interval between output pulses of the LTIME indication being generated. This increased interval causes the generation of the LTIME pulses to slow down which, in turn, allows more pointer adjustment bits to be stored in leak queue 201.

Status region 305 is defined by the absolute count of leak queue 201 being less than threshold TH4, but greater than or equal to threshold TH5. Status region 305 also indicates that the absolute value of the accumulated pointer adjustment bits is the fight number and no error signal is generated.

Status region 306 is defined by the absolute count of leak queue 201 being less than threshold TH5, but greater than threshold TH6. Status region 306 indicates that the absolute value of the accumulated pointer adjustment bits is too many. This corresponds to too many positive pointer adjustment bits being stored in leak queue 201. Decoder 203 supplies an error signal to LTPLL 204 and, therein, to phase modulator 205. In this situation the error signal is supplied to the decrement (−) input of phase modulator 205 and causes LTPLL 204 to decrease the interval between output pulses of the LTIME indication being generated. Again, this decreased interval causes the generation of the LTIME pulses to speed up which, in turn, causes fewer pointer adjustment bits to be stored in leak queue 201.

Status region 307 is defined by the absolute count of leak queue 201 being equal to or less than threshold TH6. This indicates that there are far too many positive pointer adjustment bits in leak queue 201 and a RESET is generated. The RESET causes LTPLL 204 to be reset to a condition in which LTIME pulses are generated at a predetermined shortest interval. Again, this causes bits to be leaked more rapidly and prevents an underflow condition from occurring.

In this particular implementation, threshold TH1=342, TH2=304, TH3=296, TH4=216, TH5=208 and TH6=170. By employing these threshold values the contents of leak queue 201 being at least 32 bits is substantially assured. It should also be noted that changing the values of thresholds TH1 through TH6 would change the number of bits accumulated in leak queue 201 and the dynamic performance of bit leak control circuit 105.

Phase modulator 205 (FIG. 2) is arranged to supply as an output a divide-by-nine (9) control signal every eight (8) out of 29 times it is enabled by an output from controllable divider 206. These eight (8) divide-by-nine (9) control signals are uniformly spread through the twenty-nine (29) enable signals. One arrangement which may be employed to obtain the desired uniform distribution is disclosed in U.S. Pat. No. 5,052,031 issued to N. J. Molloy on Sep. 24, 1991. An increment indication from decoder 203 causes phase modulator 205 to supply a divide-by-nine (9) control signal output sooner than normally. A decrement indication from decoder 203 causes phase modulator 205 to supply a divide-by-nine (9) control signal output later than normally.

The following pseudo code defines the algorithm for this embodiment of phase modulator 205. It will be apparent that for different desired dynamic performance of LTPLL 204, i.e., acquisition time, transient response, different values may be employed.

```
if (RESET = 1)
    {count = 0;
    divide by 8;}
if (RESET = 0 & ENABLE = 1)
    if (INC = 1 & DEC = )
        if(count < 19)
            {count = count + 10;
            divide by 8;}
        else
            {count = count − 19;
            divide by 9;}
    else if(INC = 0 & DEC = 1)
        if(count < 25)
            {count = count + 4;
            divide by 8;}
        else
            {count = count − 25;
            divide by 9;}
    else
        if(count < 21)
            {count = count + 8;
            divide by 8;}
        else
            {count = count − 21;
            divide by 9;},
``` where INC is increment, DEC is decrement and count is the value of a counter in phase modulator 205.

Controllable divider 206 normally divides LTIME by eight (8) except when a divide-by-nine (9) control signal is obtained from phase modulator 205. The phase error control signal output from controllable divider 206 is supplied to a first (+) input of phase detector 207 and to an ENABLE input of phase modulator 205. Operation of controllable divider 206 in conjunction with phase modulator 205 is to compensate, in accordance with an aspect of the invention, for the fact that, in this example, a net of 30 STS-1 bits are being leaked for a net of 29 received pointer adjustment bits. In this manner, the desired optimum bit leak interval is obtained. It is again noted that the pointer adjustment bits represent an adjustment to the STS-1 SPE bit rate which is nominally 50.112 MHz. As indicated above, no such STS-1 SPE clock signal is typically available.

Phase detector 207 is responsive to the pointer flag and the output from controllable divider 206 to generate either an increment (INC) phase error indication, a decrement (DEC) phase error indication or no phase error indication, in known fashion. The increment and decrement phase error indications are supplied to corresponding increment (+) and decrement (−) inputs, respectively, of sequential filter 208. As described below, sequential filter 208 yields a filtered version of the supplied indications which are supplied from the INC and DEC outputs of sequential filter 208 to corresponding increment (+) and decrement (−) inputs of counter 209.

Counter 209 maintains a net count of the INC and DEC indications supplied from sequential filter 208. Specifically, the count in counter 209 is incremented by one (1) in response to an INC indication from sequential filter 208 and is decremented by one (1) in response to a DEC indication. The count in counter 209 is supplied to programmable divider 210. Programmable divider 210 supplies as an output a LTIME pulse, in this example, for every number of FRAME SYNC pulses equal to the count in counter 209 plus 1. That is to say, one LTIME pulse is generated for each (COUNT+1) FRAME SYNC pulses supplied to programmable divider 210. Once each LTIME pulse has been outputted from programmable divider 210, it samples and loads the current count from counter 209.

It should be noted that a technical advantage of enabling sequential filter 208 and, hence, counter 209 by the current LTIME pulse is that the response of LTPLL 204 (FIG. 2) is proportional to the current LTIME bit interval. When the LTIME bit interval is short, LTPLL 204 responds rapidly to changes in the pointer adjustment reception rate. When the LTIME bit interval is long, LTPLL 204 responds proportionately slower to changes in the pointer adjustment reception rate. This has an added technical advantage of significantly simplifying the circuitry required to implement LTPLL 204. Additionally, it will be apparent that sequential filter 208 could be enabled in response to either a fraction of LTIME or a multiple of LTIME, in a straight forward fashion.

FIG. 4 shows, in simplified block diagram form, details of sequential filter 208. As indicated above, sequential filter 208 receives an increment (INC) or a decrement (DEC) indication from phase detector 207 and LTIME from programmable divider 210. LTIME is supplied as an ENABLE to sequential filter 208. Also supplied to sequential filter 208 are the STS-1 clock signal and the RESET. Sequential filter 208 includes counters 401, 402 and 403, OR gate 404 and OR gate 405. The CLOCK, ENABLE and RESET signals are supplied to CLK, ENABLE and RESET inputs, respectively, of each of counters 401, 402 and 403. The increment (INC) indication from phase detector 207 (FIG. 2) is supplied to counter 401 and to one input of OR gate 404. The decrement (DEC) indication from phase detector 207 is supplied to counter 402 and a second input of OR gate 404. An output from OR gate 404 is supplied to counter 403. An output from counter 401 is an increment (INC) indication and is supplied as an output to the increment (+) input of counter 209 (FIG. 2) and to one input of OR gate 405. An output from counter 402 is a decrement (DEC) indication and is supplied as an output to a decrement (−) input of counter 209 and a second input of OR gate 405. An output from counter 403 is supplied as a third input to OR gate 405. An output from OR gate 405 is supplied to the RESET input of counters 401, 402 and 403. Operation of sequential filter 208 is such that initially all of counters 401, 402 and 403 are set to a zero (0) count. An INC indication causes counter 401, and counter 403 via OR gate 404, to increment by one (1) in response to each LTIME pulse supplied to their ENABLE inputs. A DEC indication causes counter 402, and counter 403 via OR gate 404, to increment by one (1) in response to each LTIME pulse supplied to their ENABLE inputs. If the count in counter 401 is greater than or equal to a predetermined number W, an increment (INC) pulse is supplied as an output and all of counters 401, 402 and 403 are reset via an output from OR gate 405 to zero (0) counts. In this example, W equals seven (7). If the count in counter 402 is equal to or greater than a predetermined number X, a decrement (DEC) indication is supplied as an output and all of counters 401, 402 and 403 are reset via an output from OR gate 405 to zero (0) counts. In this example, X equals three (3). If the count in counter 403 is greater than or equal to a predetermined number Y, all of counters 401, 402 and 403 are reset via an output from OR gate 405 to a count of zero (0). Under this condition, no INC or DEC indication is supplied as an output from sequential filter 208. In this example, Y equals nine (9). It should be noted that parameters W, X and Y of sequential filter 208 could be made programmable through a controller interface or the like. Then the dynamic performance of LTPLL 204 could be programmably changed as desired.

Applications that have slow (on the order of seconds) pointer adjustment rates may neither require leak time phase locked loop 204 (FIG.2) to dynamically acquire the optimum bit leak rate nor require a feedback mechanism (LTIME to leak queue 201 of FIG. 2) to create a standing queue to buffer against superposition of random pointer adjustments. In such applications, a predetermined fixed bit leak rate is sufficient. However, the technique of leaking a greater number of shorter interval bits at a higher rate than the net number of received pointer adjustment bits still applies, as does, leaking a fewer number of longer interval bits at a slower rate than the net number of received pointer adjustment bits.

Figure 6:
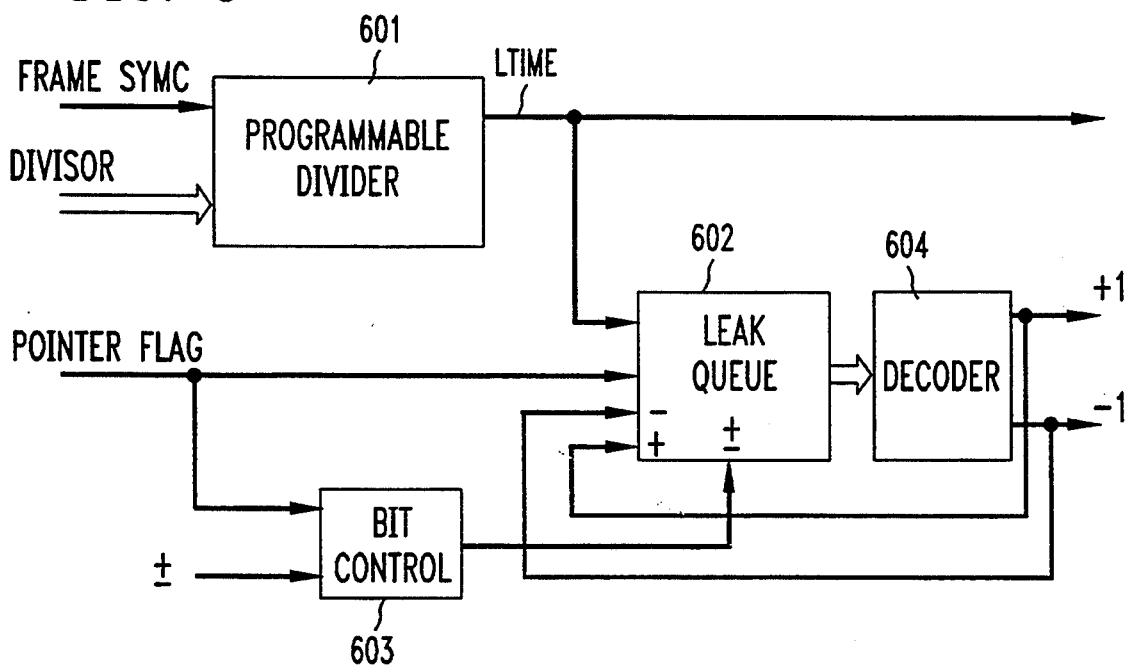
FIG. 6 shows, in simplified block diagram form, details of another example of leak control circuit 105 of FIG. 1.

FIG. 6 shows a simplified block diagram of an arrangement that can be employed in bit leak control 105 of FIG. 1 for those applications in which a fixed bit leak rate is appropriate. Specifically, shown are programmable divider 601, leak queue 602, bit control 603 and decoder 604. Programmable divider 601 provides a fixed rate LTIME pulse output. To this end, divider 601 supplies as an output a LTIME pulse for every number of FRAME SYNC pulses equal to DIVISOR plus one (1). The DIVISOR may be set at a fixed value or may be programmably set by a controller (not shown). Leak queue 602 operates in response to LTIME, POINTER FLAG and the outputs from bit control 603 and decoder 604 in the same manner as leak queue 201 (FIG. 2), described above, in generating the +1 and −1 divisor control signals. Again, the +1 and −1 divisor control signals are supplied to controllable divider 107 (FIG. 1). Bit control 603 is operative to control the incrementing and decrementing the number of bits stored in leak queue 602 when either a larger number (+) or a fewer number (−) of bits are to be leaked, as described above regarding extra bit unit 202 (FIG. 2). Decoder 604 is responsive to the count of bits stored in leak queue to generate the +1 and −1 divisor control signals, as described above regarding decoder 203 (FIG. 2).

The above-described arrangements are, of course, merely illustrative of the application of the principles of the invention. Other arrangements may be devised by those skilled in the art without departing from the spirit or scope of the invention.

I claim:

1. Apparatus for desynchronizing an incoming digital signal at an incoming digital clock rate to obtain an outgoing digital signal at an outgoing digital clock rate different from the incoming digital clock rate, the apparatus comprising:
    a source of the incoming digital signal;
    a source of the incoming clock signal;
    means for obtaining a payload data signal from the incoming digital signal;
    means for obtaining a gapped clock signal from the incoming clock signal;
    means for detecting occurrences of pointer adjustments in the incoming digital signal and for generating a first control signal representative of such occurrences of pointer adjustments and their polarity;
    means supplied with said first control signal and the incoming clock signal for determining a number and polarity of pointer adjustment bits being received and for generating leak control signals to control leaking a fewer number of bits than a net number of said received pointer adjustment bits, each received pointer adjustment bit having a predetermined bit interval;
    first controllable means supplied with the incoming clock signal and being responsive to said leak control signals for generating an adjusted reference signal including said leaked bits, each of the bits to be leaked having a bit interval longer than the bit interval of the pointer adjustment bits;
    means supplied with an outgoing clock signal for generating a phase control signal;
    phase locked loop means responsive to said adjusted reference signal and to said phase control signal for generating said outgoing clock signal; and
    elastic store means having a data in input, a write clock input, a data out output and a read clock input for reading at said data out output the outgoing digital signal in response to said outgoing clock signal being supplied to said read clock input, said payload data signal being written into said data in input in response to said gapped clock signal being supplied to the write clock input.

2. The apparatus as defined in claim 1 wherein said means for determining and generating includes means for generating polarity control signals representative of the polarity of a bit to be leaked and said first controllable means is responsive to said polarity control signals to adjust said adjusted reference signal to effectively leak a bit having a polarity indicated by said polarity control signals.

3. The apparatus as defined in claim 2 wherein said means for determining and generating further includes means for generating leak time control signals indicative of instants at which bits are to be leaked and said first controllable means is further responsive to said leak time control signals to leak bits at the occurrences of the leak time control signals, the individual bit to be leaked having a polarity indicated by said polarity control signals.

4. The apparatus as defined in claim 3 wherein said first controllable means comprises first controllable divider means having a controllable divisor and being responsive to said polarity control signals and said leak time control signals to adjust said controllable divisor at occurrences of said leak time control signals.

5. The apparatus as defined in claim 4 further including means for detecting stuff bit opportunities in said payload data signal and for generating a second control signal representative of the occurrences of said stuff bit opportunities and wherein said means for generating a phase control signal includes second controllable divider means having a controllable divisor and being responsive to said second control signal for controllably adjusting the controllable divisor value so that said phase control signal is compensated for the detected stuff bit opportunities.

6. The apparatus as defined in claim 1 wherein said means for determining and generating includes means for generating leak time control signals at instants so that said fewer number of bits than said predetermined net number of received pointer adjustment bits are leaked at a fixed bit leak rate, each of said received pointer adjustment bits having a predetermined bit interval and each of said bits to be leaked having a bit interval longer than the pointer adjustment bit interval.

7. The apparatus as defined in claim 6 wherein said means for determining and for generating further includes means for algebraically accumulating received pointer adjustment bits and means for algebraically subtracting a prescribed number of bits from a predetermined net number of accumulated pointer adjustment bits in said means for algebraically accumulating.

8. The apparatus as defined in claim 7 wherein said means determining and for generating further includes means for monitoring the number of bits accumulated in said means for algebraically accumulating to generate said polarity control signals.

9. A method for desynchronizing an incoming digital signal at an incoming digital clock rate to obtain an outgoing digital signal at an outgoing digital clock rate different from the incoming digital clock rate, including the steps of:
    supplying the incoming digital signal;
    supplying the incoming clock signal;
    obtaining a payload data signal from the incoming digital signal;
    obtaining a gapped clock signal from the incoming clock signal;
    detecting occurrences of pointer adjustments in the incoming digital signal;
    generating a first control signal representative of such occurrences of pointer adjustments and their polarity;
    in response to said first control signal and the incoming clock signal, determining a number and polarity of pointer adjustment bits being received;
    generating leak control signals to control leaking a predetermined fewer number of bits than a predetermined net number of said received pointer adjustment bits, each received pointer adjustment bit having a predetermined bit interval;

in response to the incoming clock signal and to said leak control signals, controllably generating an adjusted reference signal including said leaked bits, each of the bits to be leaked having a bit interval longer than the bit interval of the pointer adjustment bits;

in response to an outgoing clock signal, generating a phase control signal;

in response to an adjusted reference signal and to said phase control signal, generating said outgoing clock signal;

writing said payload data signal into an elastic store in response to said gapped clock signal; and reading the outgoing digital signal out of said elastic store in response to said outgoing clock.

10. A method as defined in claim 9 further including the steps of in response to said first control signal, maintaining a prescribed absolute count value of received pointer adjustment bits in a queue so that bits are available to be leaked in the presence of one or more randomly received pointer adjustments, and in response to the count of pointer adjustment bits in said queue, controllably generating said bit leak control signals to control leaking bits to compensate for said received pointer adjustments.

11. A method as defined in claim 10 wherein said fewer number of bits are leaked at a fixed bit leak rate.

12. Apparatus for desynchronizing an incoming digital signal at an incoming digital clock rate to obtain an outgoing digital signal at an outgoing digital clock rate different from the incoming digital clock rate, the apparatus comprising:

a source of the incoming digital signal;

a source of the incoming clock signal;

means for obtaining a payload data signal from the incoming digital signal;

means for obtaining a gapped clock signal from the incoming clock signal;

means for detecting occurrences of pointer adjustments in the incoming digital signal and for generating a first control signal representative of such occurrences of pointer adjustments and their polarity;

means supplied with said first control signal and the incoming clock signal for determining a number and polarity of point adjustment bits being received and for generating leak control signals to control leaking at a predetermined fixed bit leak rate a larger number of bits than a net number of said received pointer adjustment bits, each received pointer adjustment bit having a predetermined bit interval;

first controllable means supplied with the incoming clock signal and being responsive to said leak control signals for generating an adjusted reference signal including said leaked bits, each of the bits to be leaked having a bit interval shorter than the bit interval of the pointer adjustment bits;

means supplied with an outgoing clock signal for generating a phase control signal;

phase locked loop means responsive to said adjusted reference signal and to said phase control signal for generating said outgoing clock signal; and elastic store means having a data in input, a write clock input, a data out output and a read clock input for reading at said data out output the outgoing digital signal in response to said outgoing clock signal being supplied to said read clock input, said payload data signal being written into said data in input in response to said gapped clock signal being supplied to the write clock input.

13. The apparatus as defined in claim 12 wherein said means for determining and generating includes means for generating leak time control signals at instants so that said larger number of bits than said predetermined net number of received pointer adjustment bits are leaked at said fixed bit leak rate, each of said received pointer adjustment bits having a predetermined bit interval and each of said bits to be leaked having a bit interval shorter than the pointer adjustment bit interval.

14. The apparatus as defined in claim 13 wherein said means for determining and for generating further includes means for algebraically accumulating received pointer adjustment bits and means for algebraically adding a prescribed number of bits from a predetermined net number of accumulated pointer adjustment bits in said means for algebraically accumulating and means for monitoring the number of bits accumulated in said means for algebraically accumulating to generate said polarity control signals.

15. A method for desynchronizing an incoming digital signal at an incoming digital clock rate to obtain an outgoing digital signal at an outgoing digital clock rate different from the incoming digital clock rate, including the steps of:

supplying the incoming digital signal;

supplying the incoming clock signal;

obtaining a payload data signal from the incoming digital signal;

obtaining a gapped clock signal from the incoming clock signal;

detecting occurrences of pointer adjustments in the incoming digital signal;

generating a first control signal representative of such occurrences of pointer adjustments and their polarity;

in response to said first control signal and the incoming clock signal, determining a number and polarity of pointer adjustment bits being received;

generating leak control signals to control leaking at a predetermined fixed bit leak rate a predetermined larger number of bits than a predetermined net number of said received pointer adjustment bits, each received pointer adjustment bit having a predetermined bit interval;

in response to the incoming clock signal and to said leak control signals, controllably generating an adjusted reference signal including said leaked bits, each of the bits to be leaked having a bit interval shorter than the bit interval of the pointer adjustment bits;

in response to an outgoing clock signal, generating a phase control signal;

in response to an adjusted reference signal and to said phase control signal, generating said outgoing clock signal;

writing said payload data signal into an elastic store in response to said gapped clock signal; and reading the outgoing digital signal out of said elastic store in response to said outgoing clock.

16. The method as defined in claim 15 further including the steps of in response to said first control signal, maintaining a prescribed absolute count value of received pointer adjustment bits in a queue so that bits are available to be leaked in the presence of one or more randomly received pointer adjustments, and in response to the count of pointer adjustment bits in said queue, controllably generating said bit leak control signals to control leaking bits to compensate for said received pointer adjustments.

* * * * *